Patented Dec. 5, 1939

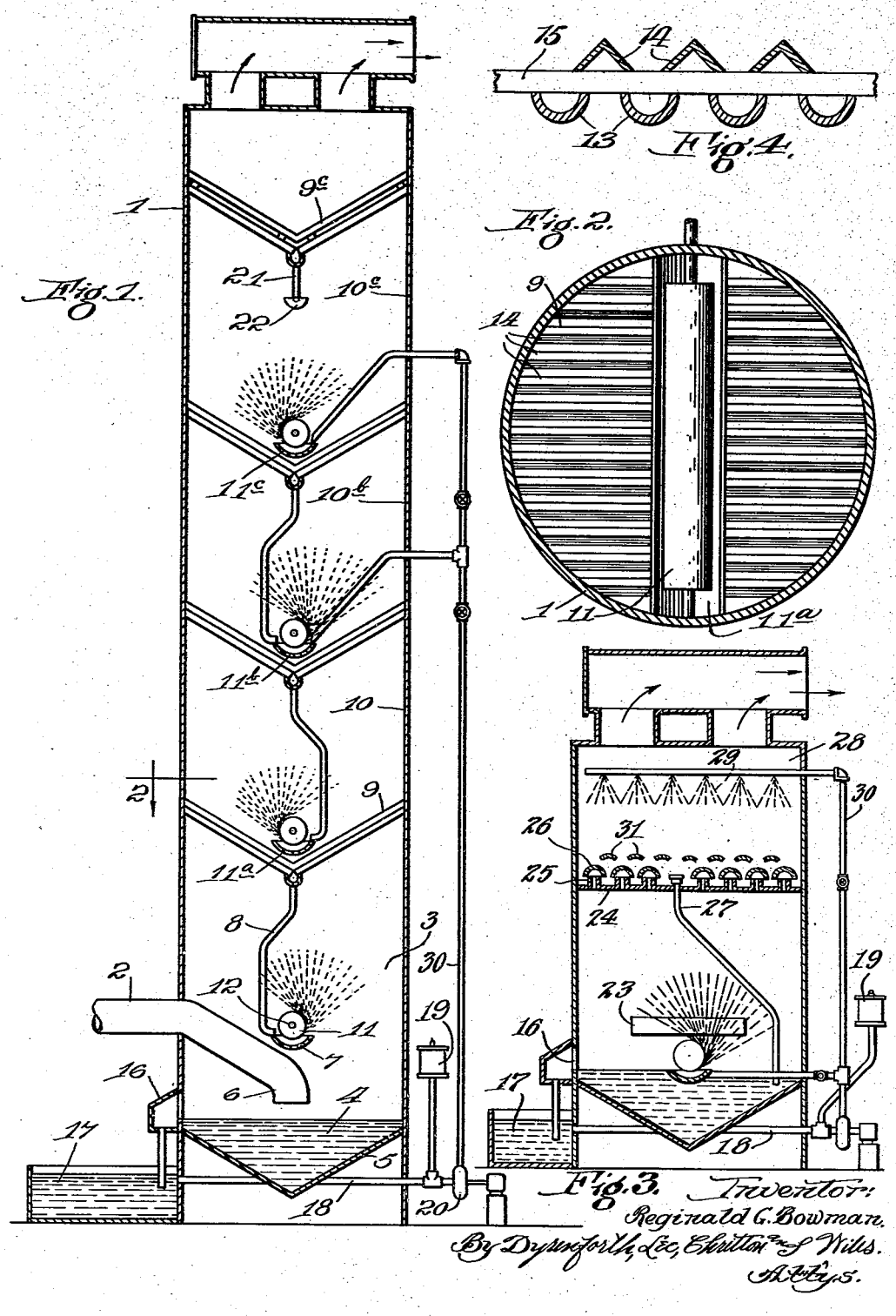

2,182,533

UNITED STATES PATENT OFFICE 2,182,533

SPRAY TOWER

Reginald G. Bowman, Gary, Ind., assignor to Traughber Engineering Co., a corporation of Ohio Application November 14, 1935, Serial No. 49,849

2 Claims. (Cl. 261—92)

This application relates to a spray tower and more particularly to an apparatus for removing fine particles from gases. In my Patent 1,959,-945, issued May 22, 1934, is described a method of removing dust and fume from gases in which an emulsion or froth consisting of a washing liquid such as water and a wetting agent such as oil, carried upon the surface of the washing liquid, contacts the dust and fume and removes them from the gases. This invention relates to an apparatus primarily designed for use with such process.

The apparatus is illustrated in the drawing, in which Fig. 1 is a vertical section through a spray tower; Fig. 2 is a sectional plan view along the line 2 in Fig. 1; Fig. 3 is a vertical section through a modified tower; and Fig. 4 is a vertical section showing in detail the overflow members.

The spray tower apparatus shown in Fig. 1 comprises a tower 1 comprising a gas inlet 2 leading into a lower chamber 3 in which a deep body of liquid 4 is maintained upon the plates 5. The gas exits through the mouth 6 of the pipe 2, preferably downwardly so that large particles of dust may enter the liquid by an inertia effect and other particles may be caught by the liquid. Above the liquid is a spray drum trough 7 which receives liquid from the pipe 8 communicating with the overflows 9 in the chamber 10. Above the trough 7 and axially parallel thereto is a long cylindrical drum 11 rotatably mounted in bearings 12 and driven by any suitable power means (not shown). This drum, which is preferably of the type known to the trade as the Christensen drum sprayer, is so positioned with respect to the liquid level in the trough that its lower edge dips very slightly into the liquid so as to carry a fine film of liquid which is then sprayed by centrifugal force throughout the chamber 3 in a very finely atomized form.

The entering gases pass downwardly against the surface of the liquid 4 and then upwardly through the mist produced by the drum 11 and then upwardly through the overflow members 9. These overflow members are so mounted, as shown in Fig. 2, as to produce an impingement grill. As shown in Fig. 4, they comprise a series of troughs 13 arranged in parallel spaced relation to each other and an alternating series of overhanging baffles 14 carried on spacers 15. The overflows are enclosed by steel plates at the sides and ends so that all gases must pass through the spaces between the troughs 13, through which they proceed upwardly, striking the baffles 14, and from there being deflected downwardly into the troughs 13. In some instances it may be desirable that the baffles 14 dip below the edges of the troughs 13. The gases are thus brought against mist-covered baffles and directed against liquid-carrying troughs to assist in contacting dust and fume with the washing agent. At the same time, the baffles serve to precipitate much or all of the mist carried by the gases. Condensed or settled liquid from the chamber 10 thus passes through the troughs 13 to the pipe 8 and is returned to the trough 7 to maintain the liquid level therein. Excess liquid from the trough 7 may drain over the edges or through the overflow into the pool of liquid 4 which is vented through the overflow weir 16 into the separating pool 17 from which it may be recycled through the line 18 and supplied with additional oil from the oil drum 19 and driven by the pump 20 into an upper portion of the tower 1, for example into the trough 11$^d$.

The overflows, instead of draining into the trough 7, may drain into the liquid 4 as shown in Fig. 3, in which case the trough itself may be supplied from the pool, or other means of supplying the trough may be used.

The same process is repeated in chamber 10 that was carried out in chamber 3 and likewise in chambers 10$^b$ and 10$^c$, in each case a means for generating spray being provided and the overflow from each chamber passing to the chamber beneath. Gases from the top chamber 10$^c$ pass through other overflow means 9$^c$ which may be provided in duplicate, and in which spray carried by the gases is precipitated and drained to the line 21 provided with an overflow cup 22 from which it is returned to the chamber 10$^c$.

In the modification shown in Fig. 3, a simplified tower is shown in which a long series of chambers is avoided. In this device gases are admitted directly over the spray through the line 23 and pass out through the bubble plate 24 provided with risers 25 and bell caps 26. A liquid level is maintained upon the plate by the height of the overflow 27. It is preferred to introduce washing liquid to the upper chamber 28 through the spray nozzles 29 to which liquid passes through the line 30. When liquid is so sprayed into the chamber, it is preferable to provide a series of baffles 31 to protect the froth which is produced around the bells from the spray.

In the operation of the spray tower, liquid is originally introduced through the line 18 into an upper portion of the spray tower, sufficient washing liquid and frothing agent being introduced to fill the series of troughs. Rotation of the spray drums may then be commenced, to fill the tower with spray, after which the gases to be cleaned are admitted to the base of the tower. In practice it is preferred to recycle the overflow liquid from the weir 16.

The wetting agent employed is preferably an oil lighter than water which will produce an emulsion in the form of a froth or foam with the water.

The foregoing description is given for clearness of understanding only, and no unnecessary limitations should be understood therefrom, for modifications will be obvious to those skilled in the art.

What I claim as new and desire to secure by Letters Patent is:

1. In apparatus for the removal of fine particles from gases: a chamber provided with gas inlet and outlet ports, a dipping-trough in said chamber provided with a rotatable drum mounted to maintain contact with liquid in said trough and upon rotation cause the formation of a fine mist, a sump in the bottom of said chamber for accumulating said liquid and provided with liquid sealed overflow means adapted to drain the liquid with dirty froth produced by the gases to a separating pool exterior of the chamber, and means for cycling separated washing liquid and a froth free wetting agent from said exterior pool to the trough.

2. Apparatus as specified in claim 1, in which additional troughs with rotatable drums are disposed in series relation above said dipping-trough, and means is provided for accumulating and conducting liquid to an underlying trough after the liquid has been thrown from a superposed adjacent trough.

REGINALD G. BOWMAN.